United States Patent [19]

Ballhaus

[11] Patent Number: 5,026,178
[45] Date of Patent: Jun. 25, 1991

[54] SENSOR BEARINGS FOR DETERMINING ROTATIONAL SPEED AND/OR ANGLE OF TORSION

[75] Inventor: Heribert Ballhaus, Nuremberg, Fed. Rep. of Germany

[73] Assignee: GMN Georg Müller Nurnberg AG Aktiengessellschaft, Fed. Rep. of Germany

[21] Appl. No.: 500,371

[22] Filed: Mar. 28, 1990

[30] Foreign Application Priority Data

May 5, 1989 [EP] European Pat. Off. ........ 89108079.8

[51] Int. Cl.⁵ ............................................. F16C 33/54
[52] U.S. Cl. ..................................... 384/448; 384/446
[58] Field of Search ............... 384/448, 446, 523, 530, 384/527, 528

[56] References Cited

U.S. PATENT DOCUMENTS

| | | | |
|---|---|---|---|
| 4,688,951 | 8/1987 | Guers | 384/446 |
| 4,865,468 | 9/1989 | Kato et al. | 384/448 |
| 4,884,901 | 12/1989 | Harsdorff | 384/448 |
| 4,946,296 | 8/1990 | Olschewski et al. | 384/448 |

Primary Examiner—Lenard A. Footland
Attorney, Agent, or Firm—Steinberg & Raskin

[57] ABSTRACT

A sensor bearing for the detection of rotational speed and angle torsion of a shaft or hub or axle comprises a bearing having an inner raceway, an outer raceway, and a cage situated between the inner raceway and the outer raceway. A plurality of balls is rotated around halfway between the inner raceway and the outer raceway at a speed proportional to the rotational speed of the shaft or hub or axle. Each of the balls contains a magnet integral thereto. The sensor bearing also comprises a plurality of hall effect sensors spaced along the inner periphery of the outer raceway and at a distance proportional to the spacing of the balls along the raceway such that, as each ball passes one of the Hall effect sensors, an electrical signal is generated. The use of two or more Hall effect snesors and the analysis of the combination of electrical signals generated thereby results in a determination of the rotational speed of the shaft or hub or axle which is superior to that which could be achieved with a single magnetic sensor.

15 Claims, 6 Drawing Sheets

SENSOR BEARINGS FOR DETERMINING ROTATIONAL SPEED AND/OR ANGLE OF TORSION

BACKGROUND OF THE INVENTION

Antifriction bearings provided or combined with signal devices which derive signals from the operating parameters of the antifriction bearings are already known in a variety of implementations as so-called "sensor bearings". Thus, in the DGM (German Utility Patent) 710 6270 force-sensing bearings are described which are used for the determination of impermissible forces on antifriction bearings and which most frequently in such prior art implementations convert the force-proportional elongation of an outer raceway for the bearings by means of elongation-measuring strips into an electrical signal.

From DE-OS 34 11 0005 a force-sensing bearing with gravitational force-sensor is known.

Other force-sensing bearings with elongation measuring strips in different configurations and implementations are known from DE-OS 27 46 937, DE-6M 84 35 935, DE-OS 27 16 024, DE-OS 27 29 699, and DE-OS 29 35 406.

Force-sensing bearings with piezoelectrical sensors are known from DE-OS 34 13 830.

Torsion-sensing bearings with mechanical determination of angle or torsions are known from DE-OS 29 07 819.

Rotational speed measuring force-sensing bearings which generate a periodic force signal with elongation-measuring strips from a periodic flexure from which the rotational speed is derived are known from DE-OS 26 42 045, DE-P 26 42 080 B2, and DE-P 26 47 440 B2.

By using materials with different coefficients of expansion bearings of the above described type can be used for the simultaneous determination of force and temperature as is known from DE-P 33 13 620 C1.

From DE-OS 34 13 046 A1 it is known to use piezoceramic converters instead of elongation-sensing strips for this purpose.

It is also known from DE-AS 22 11 859 to detect the rotational speed of rotating bodies through the detection of a radioactive marker.

For measuring the rotational speed of antifriction bodies in a rotating antifriction bearing the generation of airborne sound is also known from DE-OS 22 23 704 wherein the tone pitch of a siren-like permanent tone is proportional to the rotational speed.

Also, for monitoring the rotational speed an arrangement is known from DE-OS 29 41 564 in which through passage of the antifriction bodies of a rotating ball bearing periodic voltages are induced in a coil which surrounds a permanent magnet.

Also known from DE-OS 25 05 802 an optically or inductively-acting rotational speed sensor is disposed on a conventional ball bearing.

Also known from U.S. Pat. No. 4,732,494 is a sensor bearing for measuring the rotational speed in which a multipole magnetic ring, which comprises for example a wire, is disposed jointly with an non-magnetic carrier ring on the inner raceway of an antifriction bearing. Laterally to the non-rotating outer raceway are disposed one or more Hall sensors; the shaft rotational speed of interest in the final analysis corresponds to the inner raceway rotational speed.

SUMMARY OF THE INVENTION

The present invention is based on the task of creating a cost-effective simple sensor bearing with which the rotational speed of a shaft or a hub can be measured without external- rotational speed sensors being required and without significant additional jointly-rotating and stationary constructional parts needing to be inserted in conventional antifriction bearings. This task is solved in accordance with the invention. The sensor bearings according to the invention have in particular the advantage that expenses can be reduced and the conventional bearing widths can be retained. Preferred embodiments of the invention are described in greater detail below in conjunction with the drawings.

PREFERRED EMBODIMENTS OF THE INVENTION

Figure 1:
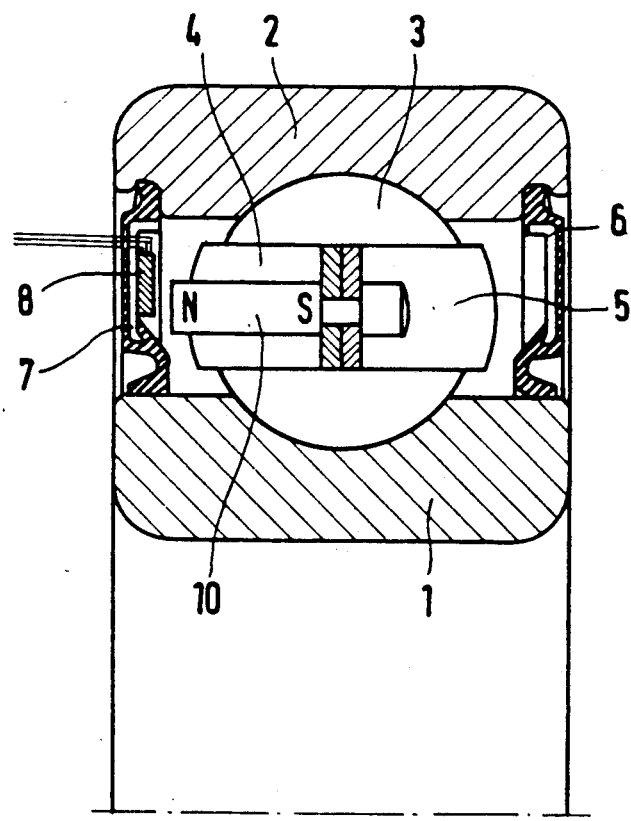
FIG. 1 is an elevational cross-sectional view of a preferred embodiment of the invention.

The inner raceway (1), the outer raceway (2), the set of balls (3), the two cage halves (4) and (5) and the right gasket (6) correspond entirely to a conventional ball bearing.

Figure 3A:
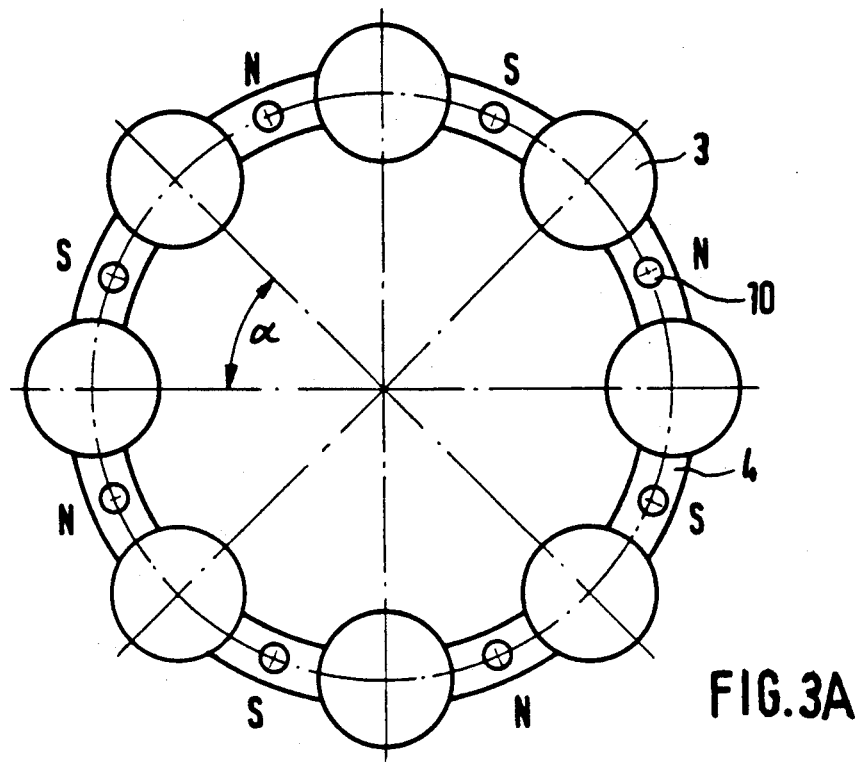
FIG. 3A shows the view of FIG. 2 with the addition of the angle designation.
Figure 3B:
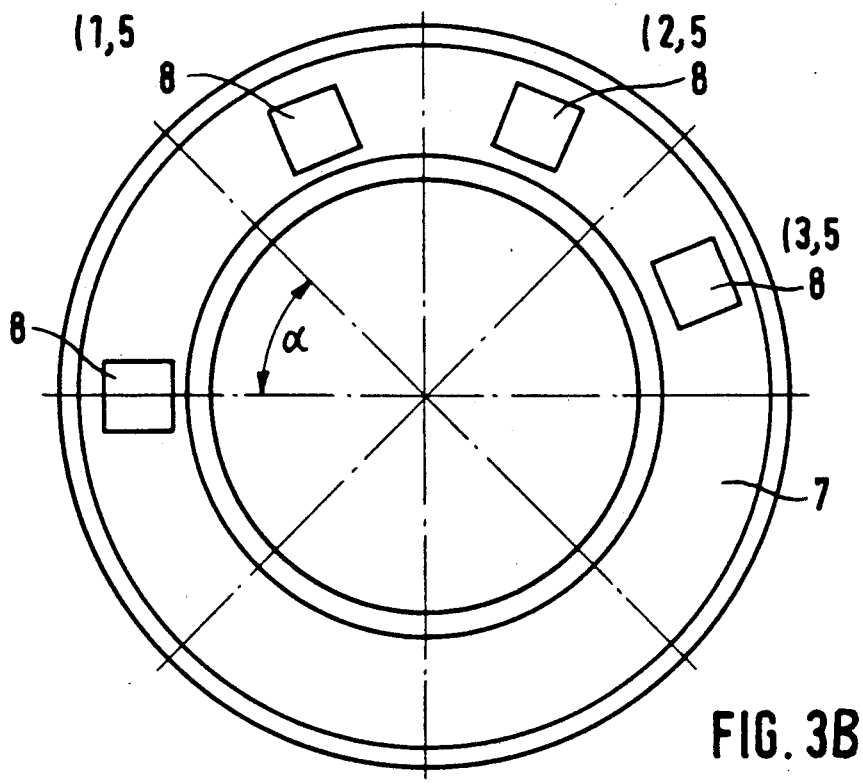
FIG. 3B shows a view of different embodiments of the invention emphasizing the positioning of the Hall sensors relative to the distance between adjacent balls.

On the inside of the left gasket (7), as is evident in FIG. 3B, two or three Hall effect sensors (8) are disposed from a first Hall effect sensor, at the 1.5 fold, 2.5-fold, 3.5-fold or 1.25-fold, 2.25-fold, 3.25-fold distance respectively of two balls. Thus FIG. 3B shows three embodiments of the invention respectively showing sensors 8a, 8b spaced at 1.5 times the distance between two adjacent balls or rollers, sensors 8a, 8c spaced at 2.5 times the distance between two adjacent balls or rollers and sensors 8a, 8d spaced at 3.5 times the distance between two adjacent balls or rollers.

Figure 2:
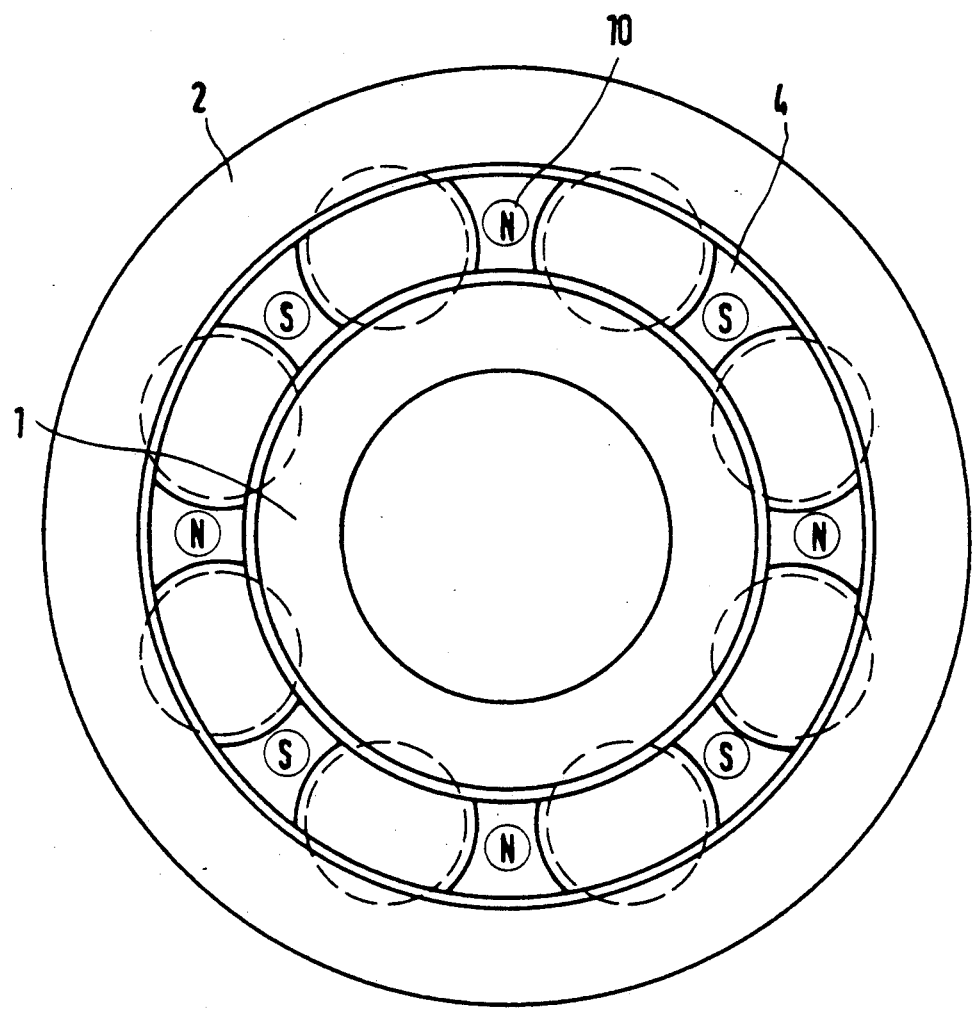
FIG. 2 is an elevational cross-sectional view of the preferred embodiment of FIG. 1 taken substantially perpendicularly to the view of FIG. 1.

The rivets (10) of the cage shown in FIG. 2 are manufactured of thermoplastically bonded strontium ferrite and are deformed during the bearing assemblage by melting-on under pressure.

The magnetization with alternating polarity, referred to by "N" and "S" for north and south, takes place before or after the final assembly of an arrangement suitable for this purpose.

Figure 4:
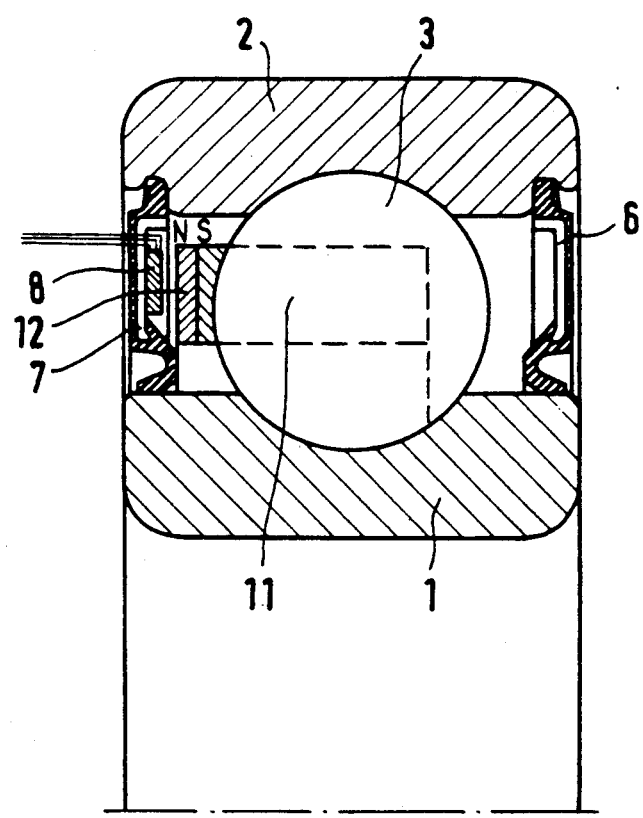
FIG. 4 shows a sectional elevational view of another embodiment of the invention with individual magnets affixed by adhesion.

FIG. 4 shows a unitary plastic cage (11) with individual magnets (12) affixed by adhesion. The polarity is characterized with "N" for north or "S" for south respectively, as in FIG. 1-3. The even number of magnets (12) can deviate from the number and division of the antifriction bodies (3). The number of magnets must be even because the North-South polarity of adjusted magnets must change and an uneven number of magnets must necessarily have two adjacent magnets with the same polarity.

Figure 5:
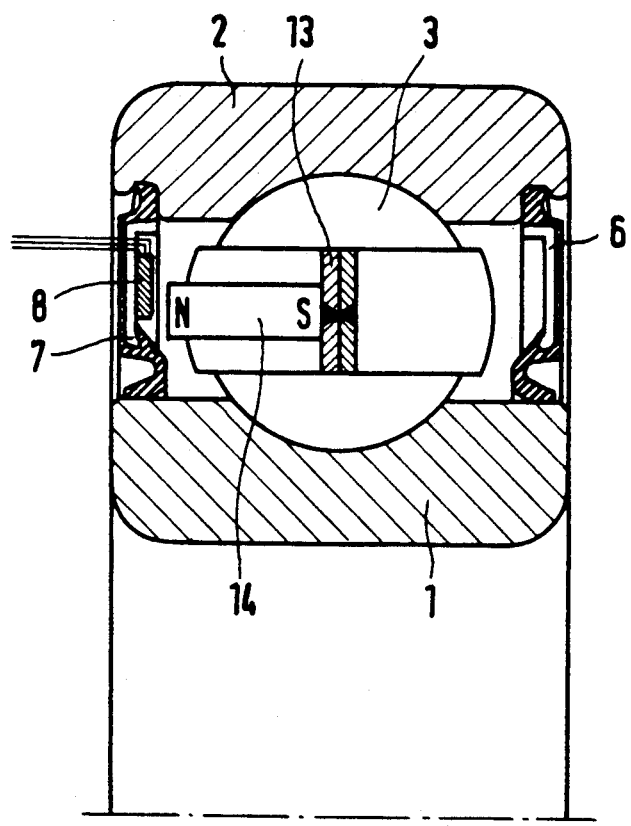
FIG. 5 shows a sectional elevational view of yet another embodiment of the invention having webs on which magnets are affixed by adhesion.

FIG. 5 shows a two-part, point-welded cage of nonmagnetic sheet steel on whose webs (13) individual magnets (14) are affixed by adhesion.

Figure 6:
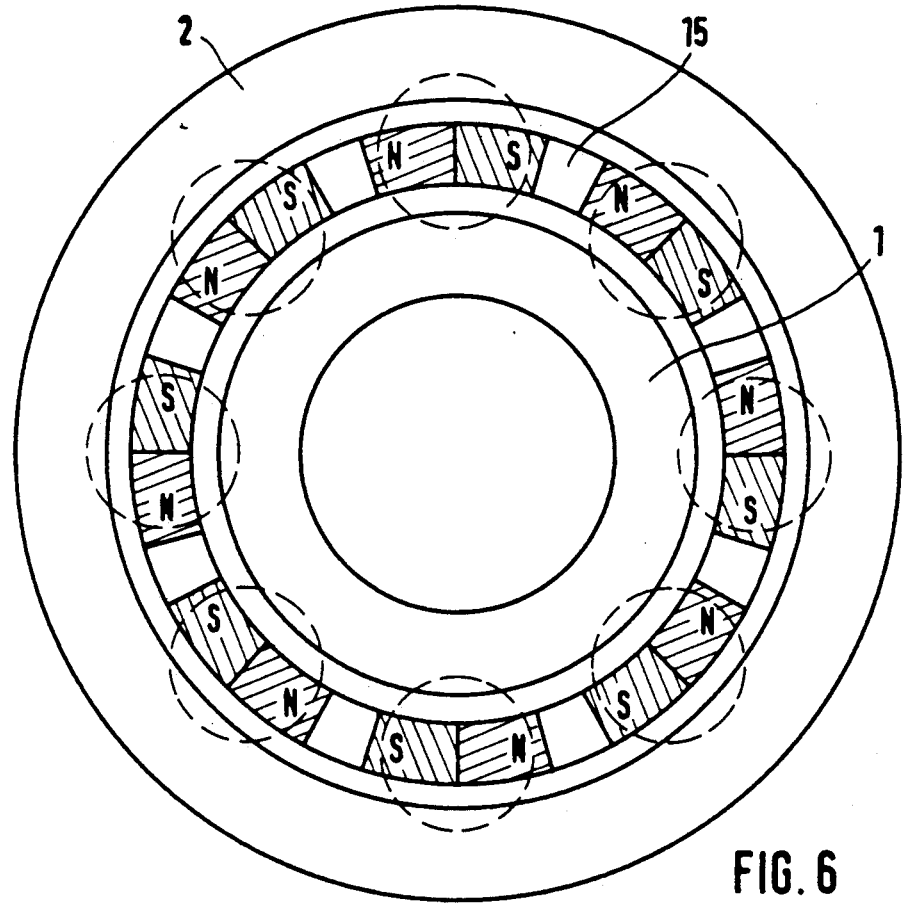
FIG. 6 is a side view similar to that of FIG. 2 showing an embodiment of the invention comprising a unitary plastic cage produced of fiber-glass polyamide with 50% strontium ferrite by weight.

FIG. 6 shows a unitary plastic cage (15) produced of fiber-glass reinforced polyamide with 50% strontium ferrite by weight. The magnetized areas are hatched, the polarity denoted by "N" and "S".

During operation of the bearing each of the Hall effect sensors (8) supplies a square wave type signal whose fundamental frequency agrees with the ball passage frequency.

Figure 7:
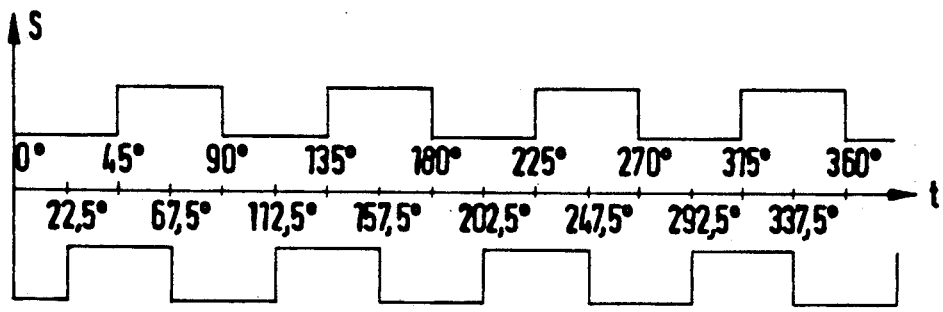
FIG. 7 is a graph showing that the offset arrangement of the sensors of the present invention results in the sensors producing square wave configuration signals resulting in a phase shift corresponding to a particular time for the rotation past of a sensor of two balls assuming constant rotational speed of said shaft or hub or axle.

Through an off-set arrangement of the sensors, for example at a 1.5-fold ratio of a ball distance, the sensors supply two phase-shifted rectangular signals as shown in FIG. 7, whose phase shift corresponds precisely to the 0.5-fold time for the rotating past of two balls if the bearing is operated with constant rotational speed.

The rotational speed measurement is already obtainable in a simple manner through the frequency measurement of the two rectangular signals, since the passage frequency of the antifriction bodies (3) is linked proportionately with the rotational speed of the inner raceway (2).

By determining the phase shift of the two other side identical signals with conventional integrated circuits, even slight changes of the rotational speed within one-half ball transit can be determined with virtually any degree of accuracy. By using a third sensor at the 1.25-fold, 2.25-fold etc. distance of the antifriction bodies the accuracy can be further improved by dividing the reference time interval.

The phase signal occurs at a fundamental frequency which, in turn, corresponds again to the frequency of the passage of the antifriction bodies. At a shaft rotational speed of for example 1800 revolutions per minute and 8 balls it is approximately 96 times per second when the cage speed is 720 revolutions per minute. By division of the instantaneous phase signal with preceding phase signals in a suitable evaluation circuit a differential signal is generated 96 times per second, i.e. a direct measure of high accuracy for an acceleration or deceleration of the rotation.

This possibility is of particular interest for advanced antiblocking systems, high-quality positioning drives of motor-driven servo valves and similar application.

The described invention allows, especially in the instance of step motors which are associated with ball bearings, a direct feedback indicating whether the number of steps given by the control is actually being passed.

Conventional positioning drives require for this purpose an additional rotary sensor.

What is claimed is:

1. A sensor bearing for the detection of rotational speed and angle of torsion of a shaft or hub or axle comprising:

a bearing comprising an inner raceway, an outer raceway, and cage means situated between said inner raceway and said outer raceway;

a plurality of magnetic means constituting an even number situated between said inner raceway and said outer raceway, each of said magnetic means being kept at a constant distance from another magnetic means respectively adjacent thereto by said cage means, said magnetic means rotating at a speed which is constantly proportional to said rotational speed to said shaft or hub or axle, and each of said magnetic means comprising a magnet of opposite polarity to the polarity of a magnet of said another magnetic means respectively adjacent thereto; and at least two magnetic sensors, each of said magnetic sensors situated in proximity to said outer raceway and spaced apart from each other and along the inner periphery of said outer raceway, and each of said magnetic sensors generating an electrical signal each time one of said rotating magnetic means comes into close proximity to said magnetic sensor during said magnetic means' rotation.

2. The sensor bearing of claim 1, wherein each of said plurality of magnetic means comprises a ball having a magnet integral thereto.

3. The sensor bearing of claim 2, wherein each of said magnets are affixed by adhesion to webs of said cage means and wherein said cage means comprises a plastic cage.

4. The sensor bearing of claim 2, wherein said cage means comprises a two-part cage of said sheet steel having a plurality of webs integral thereto and wherein each of said magnets is affixed by adhesion to at least one of said plurality of webs.

5. The sensor bearing of claim 1, wherein said cage means comprises a two-part riveted sheet consisting of non-magnetic material and a plurality of rivets for said two-part riveted sheet, said rivets each consisting of a permanently magnetic material.

6. The sensor bearing of claim 5, wherein said magnetic material is injection-moldable plastic-bonded strontium.

7. The sensor bearing of claim 5, wherein said magnetic material is injection-moldable plastic-bonded barium.

8. The sensor bearing of claim 1, wherein said cage means comprises a unitary cage produced of an injection-moldable magnetizable plastic.

9. The sensor bearing of claim 1, wherein said magnetic sensors are Hall effect sensors.

10. The sensor bearing of claim 9, further comprising at least one gasket on which said Hall effect sensors are mounted.

11. The sensor bearing of claim 9, wherein two of said Hall effect sensors are mounted along said inner periphery of said outer raceway at a spaced distance of 1.5 times the distance of adjacent said magnetic means so as to each generate electric signals the differential therebetween constituting a signal proportional to rotational speed of said shaft, hub, or axle.

12. The sensor bearing of claim 9, wherein two of said Hall effect sensors are mounted along said inner periphery of said outer raceway at a spaced distance of 2.5 times the distance of adjacent said magnetic means so as to each generate electric signals the differential therebetween constituting a signal proportional to rotational speed of said shaft, hub, or axle.

13. The sensor bearing of claim 9, wherein two of said Hall effect sensors are mounted along said inner periphery of said outer raceway at a spaced distance of 3.5 times the distance of adjacent said magnetic means so as to each generate electric signals the differential therebetween constituting a signal proportional to rotational speed of said shaft, hub, or axle.

14. The sensor bearing of claim 9, wherein three Hall effect sensors are mounted along said inner periphery of said outer raceway with one of said Hall effect sensors being spaced from a first Hall effect sensor at a distance of 1.5 times the distance of adjacent said magnetic means and another Hall effect sensor is spaced from said first Hall effect sensor at a distance of 2.5 times the distance of said adjacent magnetic means such that electrical signals are respectively generated from each of said three Hall effect sensors are generated, and from which electric signals a more accurate representation of rotation velocity of said shaft, hub, or axle can be achieved than with a similar arrangement using two Hall effect sensors.

15. The sensor bearing of claim 9, wherein three Hall effect sensors are mounted along said inner periphery of said outer raceway with one of said Hall effect sensors being spaced from a first Hall effect sensor at a distance of 1.25 times the distance of adjacent said magnetic means and another Hall effect sensor is spaced from said first Hall effect sensor at a distance of 2.25 times the distance of said adjacent magnetic means such that electrical signals are respectively generated from each of said three Hall effect sensors are generated, and from which electric signals a more accurate representation of rotation velocity of said shaft, hub, or axle can be achieved than with a similar arrangement using two Hall effect sensors.

* * * * *